March 17, 1931.   K. FUJIKAWA   1,796,516
WHEEL LIFT FOR AGRICULTURAL IMPLEMENTS
Filed June 20, 1927
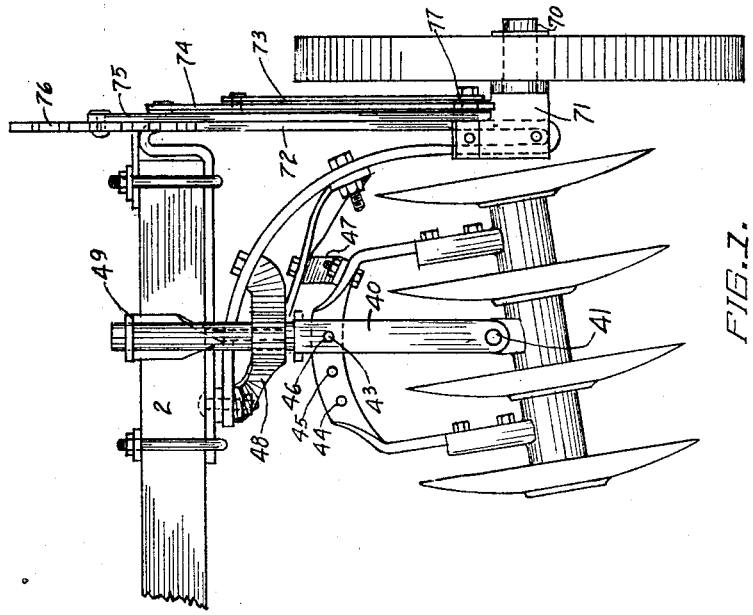
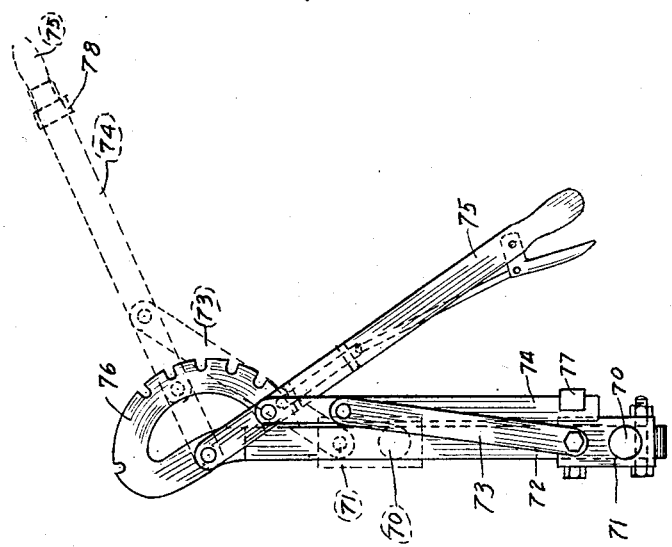
INVENTOR
K. Fujikawa
BY Murray O. Hayes
ATTORNEY Patented Mar. 17, 1931

1,796,516

UNITED STATES PATENT OFFICE

KAY FUJIKAWA, OF SALT LAKE CITY, UTAH

WHEEL LIFT FOR AGRICULTURAL IMPLEMENTS

Application filed June 20, 1927. Serial No. 200,077.

This invention relates to means for changing the positions of soil working tools of an agricultural implement, and has for its principal object to devise a mechanism which will afford a greater range of depth adjustment of such tools than is possible with present devices.

Fig. 1 is a detail of a disk set;

Fig. 2 is detail of my multiple lift lever construction.

The fact that celery is grown in a trench makes it necessary to provide a means of imparting much greater lift of the wheels with respect to the frame of an implement used in the culture thereof than is usual. My means of doing this is shown in Fig. 2 wherein the wheel supporting axle is designated by 70; said axle is fixed to a slide 71 which is slidable on guide 72. A link 73 is pivotally connected at one end to slide 71 and at the other to auxiliary lift lever 74 at a distance from the pivotal connection of said lever 74 with main lever 75; said lever 75 is in pivotal relation with a notched sector 76 in a manner well known; said sector is fixed to beam 2.

When the tools are to be kept away from the ground for moving about the parts occupy the position shown in full lines in Fig. 2, the auxiliary lever 74 being retained in a hook 77; when it is desired to use the tools in the bottom of a trench the parts are as shown in dotted lines in said figure. When the wheels are to be lifted lever 75 is moved up on sector 76; lever 74 is disengaged from 77 and moved up parallel with lever 75 where it is retained by slipping a ring 78 over the ends of both levers. To accomplish an equal lift with one lever would require placing the connection between the link 73 and said lever so far out from the pivot of said lever that it would be very difficult or impossible to operate; with my device I use two short lifts with relatively great mechanical advantage instead of one long one with little or no advantage.

While the present invention has been particularly referred to in connection with a machine for the culture of celery, it is to be understood that it may be used in any place where applicable without being beyond the scope of the claims.

I claim:

1. In combination, an implement frame, a sector carried by said frame, a lever pivoted adjacent said sector, a detent on said lever, the said detent engageable with said sector in a plurality of positions, a guide carried by said frame, a slide operable on said guide, means connecting said slide and said lever, the said means including devices to impart to said slide a greater movement than that due to the manipulation of said lever, and an axle for a ground wheel carried by said slide.

2. In combination, an implement frame, a sector carried by said frame, a main lever pivoted adjacent said sector and provided with means to engage said sector, a guide carried by said frame, a slide operable on said guide, an auxiliary lever pivoted to said main lever, a link connecting said auxiliary lever and said slide, means to retain said auxiliary lever parallel to said main lever, means to retain said auxiliary lever non-parallel to said main lever, and an axle for a ground wheel carried by said slide.

3. An axle movably mounted upon a frame, a lever mounted upon said frame and operatively connected to said axle, the connecting mechanism between said lever and said axle including means for imparting to said axle a movement in addition to that due to manipulation of said lever.

4. In combination, a supporting member, a movable member operatively connected thereto, a main lever mounted on said supporting member, an auxiliary lever secured to said main lever, connecting means between said auxiliary lever and said movable member, and an axle for a ground wheel carried by said movable member.

5. In combination, an implement frame, a sector carried by said frame, a lever pivoted adjacent said sector, a detent on said lever, the said detent engageable with said sector in a plurality of positions, a guide carried by said frame, a slide operable on said guide, a hook on said slide, a lever having one end pivoted to the first-mentioned lever and the other end free but engageable by said hook, a link having one end pivoted to said second-mentioned lever and the other end pivoted to said slide, and an axle for a ground wheel carried by said slide.

6. In combination, a frame, a pivoted lever carried thereby, means to lock said lever in a plurality of positions, a guide carried by said frame, a slide operable on said guide, a second lever whereof one end is pivoted to the first-mentioned lever, a link pivoted at one end to said second lever and at the other end to said slide, a hook disposed to be engageable with an end of said second lever, and an axle for a ground wheel carried by said slide.

KAY FUJIKAWA.